(No Model.) N. SALAMON. 3 Sheets—Sheet 1.
Velocipede.
No. 236,372. Patented Jan. 4, 1881.
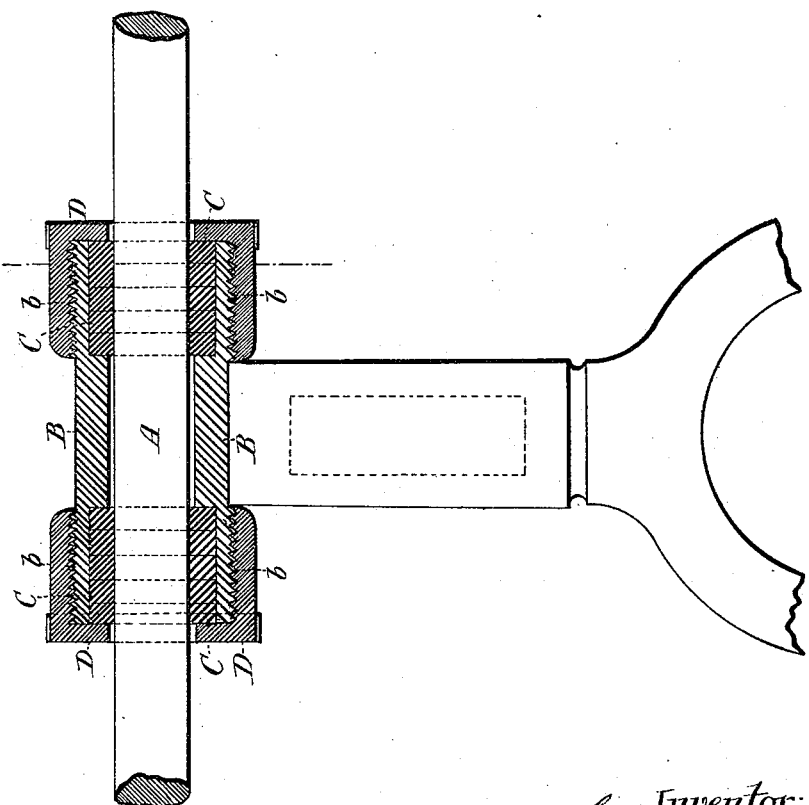

(No Model.) 3 Sheets—Sheet 2.
N. SALAMON.
Velocipede.
No. 236,372. Patented Jan. 4, 1881.
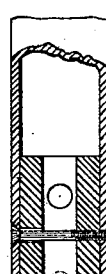
Fig. 2.
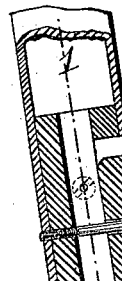
Fig. 1.
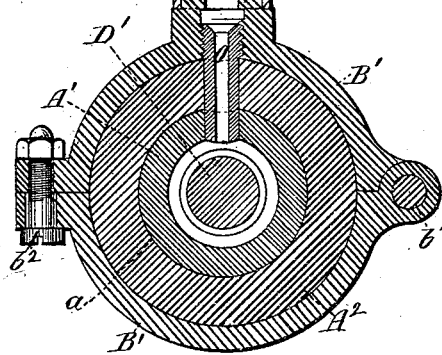
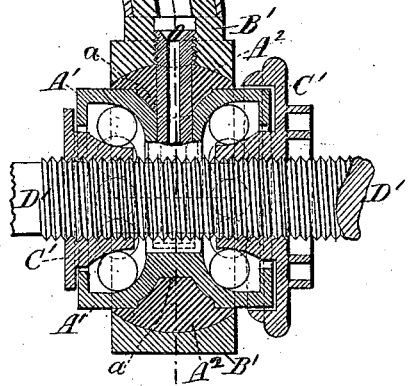
Fig. 7.
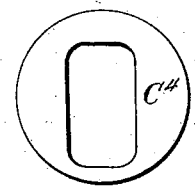
Figs. 5.
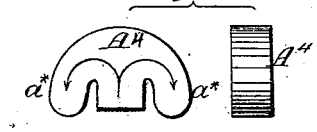
Fig. 6.
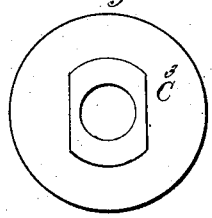
Fig. 3.
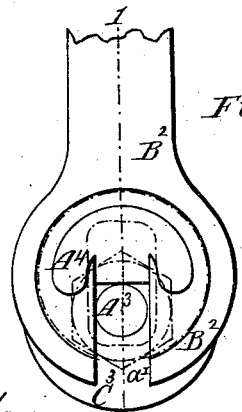
Fig. 4.
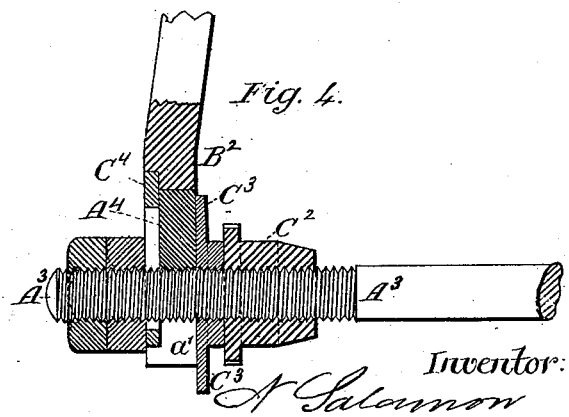
Witnesses
Fred K Haynes
Thomas E Birch
Inventor:
N Salamon
by his Attorneys
Brown & Brown (No Model.) 3 Sheets—Sheet 3.

N. SALAMON.
Velocipede.

No. 236,372. Patented Jan. 4, 1881.

Witnesses
Fred Haynes
Thomas E. Birch

Inventor:
N. Salamon
by his Attorneys
Brown & Brown

UNITED STATES PATENT OFFICE.

NAHUM SALAMON, OF LONDON, ENGLAND.

VELOCIPEDE.

SPECIFICATION forming part of Letters Patent No. 236,372, dated January 4, 1881.

Application filed September 24, 1880. (No model.) Patented in England December 24, 1879, and March 18, 1880.

*To all whom it may concern:*

Be it known that I, NAHUM SALAMON, of Holborn Viaduct, in the city of London, England, sewing-machine factor, have invented certain Improvements in Elastic Fittings for Velocipedes, of which the following is a specification.

The object of this invention is to prevent the rider of bicycles and other velocipedes from feeling the jar or vibration caused by his machine passing over irregular ground, and this result is obtained by a novel application of india-rubber, or equivalent elastic material, which is so arranged as to absorb the tremor of the wheels and frame-work of the machine.

The parts of a bicycle which are most affected by the jarring action of irregular surfaces are the handle-bar, the bearings for the wheels, and the points of suspension of the saddle or seat; and I will now proceed to describe my invention as applied to these parts, with reference to the drawings on Sheets I, II, and III.

Figure 1:
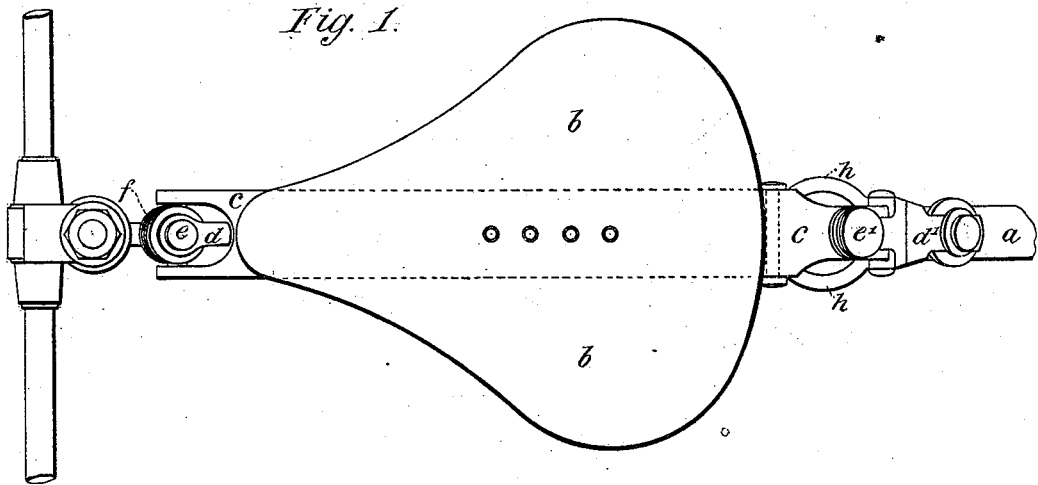
Figure 2:
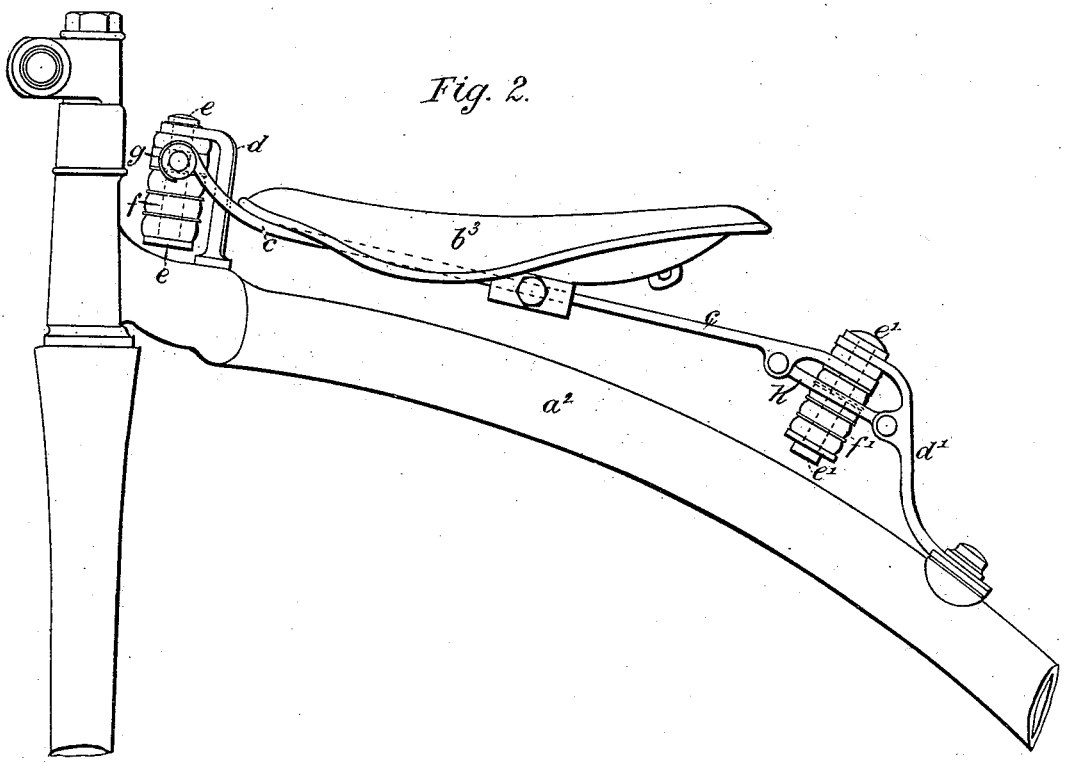

Figures 1 and 2, Sheet I, show, in longitudinal section and end view, partly in section, a portion of a hand-bar and fork-stem of a bicycle fitted with elastic washers so interposed between the handle-bar and the sleeve or socket of the fork-stem through which the handle-bar passes as to insulate the handle-bar from all direct metallic contact with the fork-stem.

At the upper end of the fork-stem, and in front thereof, is a sleeve or socket, B, so formed as to allow of the handle-bar A passing freely through it and having slight play therein, and the ends of this sleeve are chambered to receive a series of washers, C, of india-rubber, or its equivalent, and are threaded on their outer periphery, $b$, to allow of the metal caps D D being screwed thereon to retain the washers in position. As shown in the drawings, these washers C are of circular form and are slipped over the handle-bar. They are then pressed tightly into the chambered ends of the fixed sleeve B, and retained in place by the screw-caps D D. It will thus be seen that the handle-bar A rests firmly embedded in an elastic medium out of contact with any metal, and cannot, therefore, receive any violent shock from direct metallic contact with the frame.

In Sheet II of the drawings I have shown my invention as applied to the wheel-bearings of a bicycle, the same principle being observed— viz., interposing a firmly-held elastic washer or cushion between the metal surfaces, which would otherwise be placed in contact. In this instance the elastic washer or cushion is shown interposed between the bearing of the steering-wheel and the termination of the steering-fork, and also between the axle of the hind wheel and the forked termination of the back-bone.

Fig. 1 shows one of the prongs of the steering-fork and its roller-bearing in transverse vertical section—*i. e.*, in the line of the crank-axle—and Fig. 2 is a vertical section, taken at right angles thereto, on the line 1 2 of Fig. 1.

A′ is the case, forming part of the ball-bearing, and having a groove, $a$, turned in its outer periphery to receive the elastic washer or cushion A², of india-rubber, or its equivalent, which is sprung into the groove $a$, and is retained therein by its own elasticity. B′ is the griping termination of the steering-fork, made in two parts, which are hinged together at $b'$, and securely clasped upon the ball-bearing, fitted with its elastic cushion, by a clamping-screw, $b^2$, as usual. C′ C′ are the inner and outer cones, carried on the threaded portion of the axle D′, and upon which they may be adjusted by turning them axially, as will be well understood.

To provide for the lubrication of the bearings, I screw or otherwise fit a hollow plug, $o$, into the termination of the fork, the rubber washer or cushion being formed with an opening to allow of the hollow plug projecting through it and into a hole bored in the casing A′ for the passage of the oil through the bearings to the axle of the wheel. This arrangement allows of the hollow plug $o$ rising and falling freely through the aperture in the ball-bearing casing, and effectually prevents the access of oil to and its injurious effects upon the india-rubber washer or cushion. With the bearings of the steering-wheel thus fitted with the elastic washers or cushions little or no tremor will be transmitted, as is now commonly the case, to the steering-handles, and through them to the rider. I would remark that this mode of absorbing the vibration is applicable to velocipedes generally.

In Figs. 3, 4, and 5 I have shown the mode of applying elastic cushions to the hind wheel of a bicycle so as to absorb the tremor which is imparted to this wheel on its passage over rough ground and prevent it from jarring the rider. Fig. 3 is a front view of one of the prongs of the forked termination of the backbone of the bicycle, between which is mounted the hind wheel of the bicycle. Fig. 4 is a vertical section of the same at right angles thereto, taken on the line 1 2 of Fig. 3.

$A^3$ is the axle on which the hind wheel is mounted. $B^2$ is one of the prongs of the forked termination of the backbone, which is flattened out in the form of a disk and slotted to receive a cushion or block of india-rubber, or its equivalent, of the shape shown at $A^4$, Fig. 5, in front and edge view, which block overlies and receives the upward pressure of the axle of the hind wheel.

$C^2$, Fig. 4, is an adjustable cone mounted on the threaded portion of the axle $A^3$, and having a milled rim for facilitating its lateral adjustment.

$C^3$ and $C^4$ are circular plates of metal placed on opposite sides of the disk-shaped end of the fork $B^2$ to limit the lateral spread of the india-rubber block $A'$. It will be now perceived that the upward pressure of the axle $A^3$ upon the block $A^4$ will be diverted, in the direction of the arrows, to the extremities of the curved portions $a^*$ of the block $A^4$, and thus a great amount of elasticity will be obtained by thus constructing the block, and this within a minimum of space.

The plate $C^3$ (shown detached in front view at Fig. 6) serves also as a lock-nut to the adjustable cone $C^2$, being threaded to turn on the threaded portion of the axle $A^3$.

The plate $C^4$ (shown detached in front view at Fig. 7) is let into the recessed portion of the disk-shaped end of the fork $B^2$, and lies flush with the outer side of the said fork $B^2$, as will be seen in Fig. 4. This plate is slotted, as shown at Fig. 7, to allow of the axle rising and falling in the slot $a'$, formed in the disk-shaped end $B^2$, as the weight on the backbone of the bicycle varies. It will thus be seen that the rubber cushion or block $A^4$ will intercept and absorb most of the tremor resulting from the passage of the hind wheel over rough ground, and this mode of absorbing the tremor is capable of being applied to velocipedes generally. The better, however, to protect the rider against the effects of vibration I apply the same principle to the points of support for the saddle or seat of the rider, thus completely insulating him from the jarring caused by irregular surfaces. This I effect by employing suspended elastic washers to receive the pressure of the saddle. At the same time I provide for the adjustment of the saddle-bar to suit riders of varying weights by increasing or diminishing the number of the said elastic washers.

Figs. 1 and 2, Sheet III, show, in plan view and side elevation, the manner of mounting the saddle-bar of a bicycle according to my invention.

$a^2$ is the backbone, fitted with a saddle, $b^3$, which is attached, in any approved manner, by its metallic shell to a saddle-bar, $c$, which is made preferably of an elastic bar of steel. This saddle-bar $c$ is supported at each end upon, and it may be between, elastic washers $f f'$. Fitted to the forward end of the backbone, and immediately in front of the pommel of the saddle, is a bracket, $d$, from which depends a bolt, $e$, such bolt being held in position, head downward, by means of a nut. Upon this bolt is strung a series of washers, $f$, of vulcanized india-rubber, or its equivalent, having thin metal washers interposed between them, and overlying these washers is a plate or collar, $g$, formed with trunnions on its periphery, which are embraced by hooked terminations of the saddle-bar $c$, which, it will be seen, is forked at its forward end to allow of the bracket $d$ standing up and carrying the pendent bolt $e$ between its hooked extremities. The hooks of the saddle-bar are secured to the collar $g$ by means of screws which enter the ends of the trunnions and press loose washers against the hooked ends, so as to hold them securely in place on the trunnions. When the pendent bolt $e$ is secured to the bracket $d$ any pressure thrown on the forward end of the saddle-bar will be received by the elastic washers $f$, and elasticity will be imparted to the seat.

The rear end of the saddle-bar is formed with an elongated eye, through which passes a vertical bolt, $e'$, pendent from a bracket, $d'$, which is attached to the rear of the backbone. This bolt is fitted with an elastic cushion of washers, $f'$, similar to those on the front bolt, which cushion forms an elastic support for the rear end of the saddle-bar $c$. Interposed between the saddle-bar and the bracket $d'$ is another elastic washer to take the rebound of the saddle-bar, and a like provision is made for the forward end of the saddle-bar. A nut fitting on the upper end of each bolt will serve to retain the saddle-bar and washers in place.

To remove all tendency to longitudinal oscillations of the saddle-bar $c$, I connect the rear end of that bar with the bracket $d'$ by means of a forked link-piece, $h$. This link-coupling, while it presents no obstruction to the rise and fall of the bar, will serve as a stay against the motion of the saddle in any other direction, and thus an easy and safe seat will be secured to the rider.

The elastic cushions, composed of india-rubber washers and separating metal washers, as shown in the drawings, are arranged for a maximum weight of rider; but for riders of lighter weight one or more of the elastic washers underlying the plate or collar $g$ and the rear end of the saddle-bar $c$ may be withdrawn and placed above the collar and the eye of the saddle-bar respectively. By this means the elasticity of the seat may be readily adjusted to suit all riders.

Having now set forth the nature of my invention, I wish it to be understood that I claim—

1. The combination, with a fork-stem for a velocipede having at its upper end a socket chambered at each end, of a handle-bar inserted through but slightly smaller than said socket, and washers of rubber or other elastic material fitting upon said bar within the chambered ends of said socket, substantially as and for the purpose specified.

2. The combination of the fork-stem having a socket, B, chambered at the ends and having exterior screw-threads, $b$, the washers C, inserted into the chambered ends of said socket, and the screw-caps D, fitting the exterior of said socket, all substantially as specified.

3. The combination of the steering-fork termination B', the case A', constructed with a groove, $a$, the washer or cushion $A^2$, and the hollow plug $o$, inserted through said washer or cushion and through said case, substantially as and for the purpose specified.

4. The combination, with the hind-wheel axle $A^3$ and slotted disk-shaped end $B^2$, of the plates $C^3$ and $C^4$, arranged one upon each side of the end $B^2$, and the elastic cushion or block $A^4$, held between said plates, all substantially as and for the purpose specified.

5. The combination of the backbone $a^2$, the saddle-bar $c$, brackets $d$ $d'$, bolts $e$ $e'$, trunnion plate or collar $g$, the elastic washers $f$ $f'$, fitting upon the bolts $e$ $e'$, and the link $h$, all substantially as and for the purpose specified.

Dated the 14th day of August, 1880.

N. SALAMON.

Witnesses:
H. K. WHITE,
    66 *Chancery Lane, London.*
J. MYERS,
    27 *Holborn Viaduct, E. C.*